United States Patent
Zeng et al.

(10) Patent No.: US 12,399,691 B2
(45) Date of Patent: Aug. 26, 2025

(54) METHOD AND SYSTEM FOR AUTOMATIC WORKFLOW GENERATION BY LARGE LANGUAGE MODELS

(71) Applicant: JPMorgan Chase Bank, N.A., New York, NY (US)

(72) Inventors: Zhen Zeng, Ypsilanti, MI (US); William Watson, Long Beach, NY (US); Naan Cho, New York, NY (US); Saba Rahimi, Laguna Niguel, CA (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 215 days.

(21) Appl. No.: 18/237,681

(22) Filed: Aug. 24, 2023

(65) Prior Publication Data
US 2025/0068398 A1    Feb. 27, 2025

(51) Int. Cl.
| | | |
|---|---|---|
| *G06F 8/30* | (2018.01) | |
| *G06F 8/35* | (2018.01) | |
| *G06F 9/54* | (2006.01) | |
| *G06Q 40/06* | (2012.01) | |

(52) U.S. Cl.
CPC .............. *G06F 8/35* (2013.01); *G06F 9/54* (2013.01); *G06Q 40/06* (2013.01)

(58) Field of Classification Search
CPC ...................................................... G06F 8/30
See application file for complete search history.

(56) References Cited

U.S. PATENT DOCUMENTS

| | | | | |
|---|---|---|---|---|
| 2024/0370765 | A1* | 11/2024 | Pierucci | G06F 40/30 |
| 2024/0386214 | A1* | 11/2024 | Ghoche | G06Q 30/015 |
| 2024/0403895 | A1* | 12/2024 | Menon | G06Q 50/02 |

* cited by examiner

*Primary Examiner* — Jae U Jeon
(74) *Attorney, Agent, or Firm* — GREENBLUM & BERNSTEIN, P.L.C.

(57) ABSTRACT

A method for using a large language model to generate executable code for workflow execution in a manner that integrates user feedback and adjusts the workflow as needed while preserving data privacy is provided. The method includes: receiving first information that relates to a workflow context, second information that relates to at least one application programming interface (API), and third information that relates to a code generation request; using the received information to generate a lecture, and transmitting the lecture to a language model; receiving a user query that relates to performing a task, and transmitting the query to the language model; receiving a workflow that is automatically generated by the language model based on the lecture and the query; and executing the workflow in order to generate an output that is responsive to the query.

20 Claims, 7 Drawing Sheets

600

Imagine we are working with a document bot. The job of this bot is to respond to information queries from user.

The main functions you can use are:
-get_all_reports(): Returns all N-CEN reports.
-get_report(fund_name): Returns the N-CEN report that contains the fund specified by the fund_name.
-segment_report(report): Returns parsed blocks from the input report, each block describes a fund.
-fetch_block(report, fund_name): Returns the corresponding block for the fund in the input report.
-extract_entity(block, entity_label): Extracts the name of the entity that is in the specified entity_label from the input text block.
-extract_value(block, value_name): Extracts the numeric value as specified by the value_name from the input text block.

Wait for user queries, then write python code (with modularization) and use these functions to respond. Let me know once you are ready for user queries.

FIG. 6

METHOD AND SYSTEM FOR AUTOMATIC WORKFLOW GENERATION BY LARGE LANGUAGE MODELS

BACKGROUND

1. Field of the Disclosure

This technology generally relates to methods and systems for generating executable code for workflow execution, and more particularly to methods and systems for using a large language model to generate executable code for workflow execution in a manner that integrates user feedback and adjusts the workflow as needed while preserving data privacy.

2. Background Information

Robotic Process Automation (RPA) has been widely recognized for its potential to automate repetitive tasks in various industries. For instance, repetitive tasks such as data entry, invoice processing, or customer service responses have been successfully automated using RPA. These tasks often involve pre-defined workflows that, once created, can be reused multiple times, significantly enhancing the efficiency and accuracy of the tasks. Based on rule-based business processes, or by observing human digital actions, RPAs provide a software solution to automating repetitive tasks and has seen success across various domains. However, this approach requires expert knowledge and well-defined procedures or steps, which are not always available, especially for more spontaneous or unpredictable tasks. Additionally, an RPA lacks objective reasoning around its application or development. When dealing with such tasks, which users might interactively demand, the limitation of an RPA becomes apparent. Pre-defined workflows are inadequate for handling such situations, necessitating automatic workflow generation to manage them effectively.

Large Language Models (LLMs), especially in their use for code generation, have seen considerable exploration and advancement. The rise of the Generative Pretrained Transformer (GPT) models has spurred further exploration, specifically regarding their potential to generate code in various domains. Furthermore, prior work has explored chain of thought through code, as demonstrated for robotic programs, action plan generation, web browsing, learning tools, or generating valid arithmetic programs. Recently, LLMs have shown the ability to construct modular code for visual question answering based on abstractions of high-level application programming interfaces (APIs). These studies utilized techniques like prompt engineering and few-shot learning to harness the capabilities of GPT for code generation. However, while promising, much of this work has been somewhat anecdotal, providing qualitative examples and demonstrations but lacking rigorous analysis of quantitative performance against benchmark datasets. Few LLMs have been fine-tuned on finance-related tasks, however, none of these focused on leveraging LLMs for coding.

Building on the capabilities of LLMs for code generation, recent advancements have seen the development of application tools that leverage LLMs for workflow generation, such as Langchain, HuggingFace's Transformer Agent, and AutoGPT. Langchain, for instance, focuses on integrating LLMs with external data, utilizing a scalable approach to chunk data for interaction with a large database. However, applying this in fields like finance raises serious data privacy concerns, because the model directly interacts with the data. With powerful LLMs like GPT, where inference does not occur locally, it is critical to limit direct interaction with private data as much as possible. On the other hand, Transformer Agent, while being a novel approach to task automation, is primarily aimed at combining different transformer models for user-requested tasks. Thus, it might not be flexible enough to easily incorporate other types of functions/models typically developed as proprietary software in various industries. AutoGPT provides limited problem-solving capabilities due to the limited set of functions in its library, such as web browsing and executing code.

Accordingly, there is a need for a mechanism for using a large language model to generate executable code for workflow execution in a manner that integrates user feedback and adjusts the workflow as needed while preserving data privacy.

SUMMARY

The present disclosure, through one or more of its various aspects, embodiments, and/or specific features or sub-components, provides, inter alia, various systems, servers, devices, methods, media, programs, and platforms for methods and systems for using a large language model to generate executable code for workflow execution in a manner that integrates user feedback and adjusts the workflow as needed while preserving data privacy.

According to an aspect of the present disclosure, a method for generating a workflow is provided. The method is implemented by at least one processor. The method includes: receiving, by the at least one processor, first information that relates to a workflow context, second information that relates to at least one application programming interface (API), and third information that relates to a code generation request; generating, by the at least one processor based on the first information, the second information, and the third information, a lecture, and transmitting the lecture to a language model; receiving, by the at least one processor from a user, a query that relates to performing a task, and transmitting the query to the language model; and receiving, by the at least one processor from the language model, a workflow that is automatically generated by the language model based on the lecture and the query.

The method may further include executing the workflow in order to generate an output that is responsive to the query.

The method may further include: receiving, from the user, feedback that relates to the workflow; transmitting the feedback to the language model; and receiving, from the language model, a modified workflow that is automatically generated based on the feedback.

The first information may include a textual description of a domain of a task to be performed based on an expected type of the query.

The second information may include a name, an input argument type, and a description of an output type for at least one API from among a predetermined set of APIs that corresponds to a predetermined library of functions.

The query may include a request for a specific type of information.

The query may relate to fourth information included in a set of annual filings for registered investment companies that are submitted pursuant to a governmental regulation and are publicly available.

The fourth information may relate to a single fund that is administered by a single investment company.

Alternatively, the fourth information may relate to a plurality of funds that are administered by a single investment company.

The method may further include displaying the output on a display via a graphical user interface (GUI).

According to another exemplary embodiment, a computing apparatus for generating a workflow is provided. The computing apparatus includes a processor; a memory; a display; and a communication interface coupled to each of the processor, the memory, and the display. The processor is configured to: receive, via the communication interface, first information that relates to a workflow context, second information that relates to at least one application programming interface (API), and third information that relates to a code generation request; generate, based on the first information, the second information, and the third information, a lecture, and transmit the lecture to a language model; receive, via the communication interface from a user, a query that relates to performing a task, and transmit the query to the language model; and receive, from the language model, a workflow that is automatically generated by the language model based on the lecture and the query.

The processor may be further configured to execute the workflow in order to generate an output that is responsive to the query.

The processor may be further configured to: receive, from the user via the communication interface, feedback that relates to the workflow; transmit the feedback to the language model; and receive, from the language model, a modified workflow that is automatically generated based on the feedback.

The first information may include a textual description of a domain of a task to be performed based on an expected type of the query.

The second information may include a name, an input argument type, and a description of an output type for at least one API from among a predetermined set of APIs that corresponds to a predetermined library of functions.

The query may include a request for a specific type of information.

The query may relate to fourth information included in a set of annual filings for registered investment companies that are submitted pursuant to a governmental regulation and are publicly available.

The processor may be further configured to cause the display to display the output via a graphical user interface (GUI).

According to yet another exemplary embodiment, a non-transitory computer readable storage medium storing instructions for generating a workflow is provided. The storage medium includes executable code which, when executed by a processor, causes the processor to: receive first information that relates to a workflow context, second information that relates to at least one application programming interface (API), and third information that relates to a code generation request; generate, based on the first information, the second information, and the third information, a lecture, and transmit the lecture to a language model; receive, from a user, a query that relates to performing a task, and transmit the query to the language model; and receive, from the language model, a workflow that is automatically generated by the language model based on the lecture and the query.

When executed, the executable code may further cause the processor to execute the workflow in order to generate an output that is responsive to the query.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is an example of a lecture that is generated and fed as an input to a large language model in a method for using a large language model to generate executable code for workflow execution in a manner that integrates user feedback and adjusts the workflow as needed while preserving data privacy, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
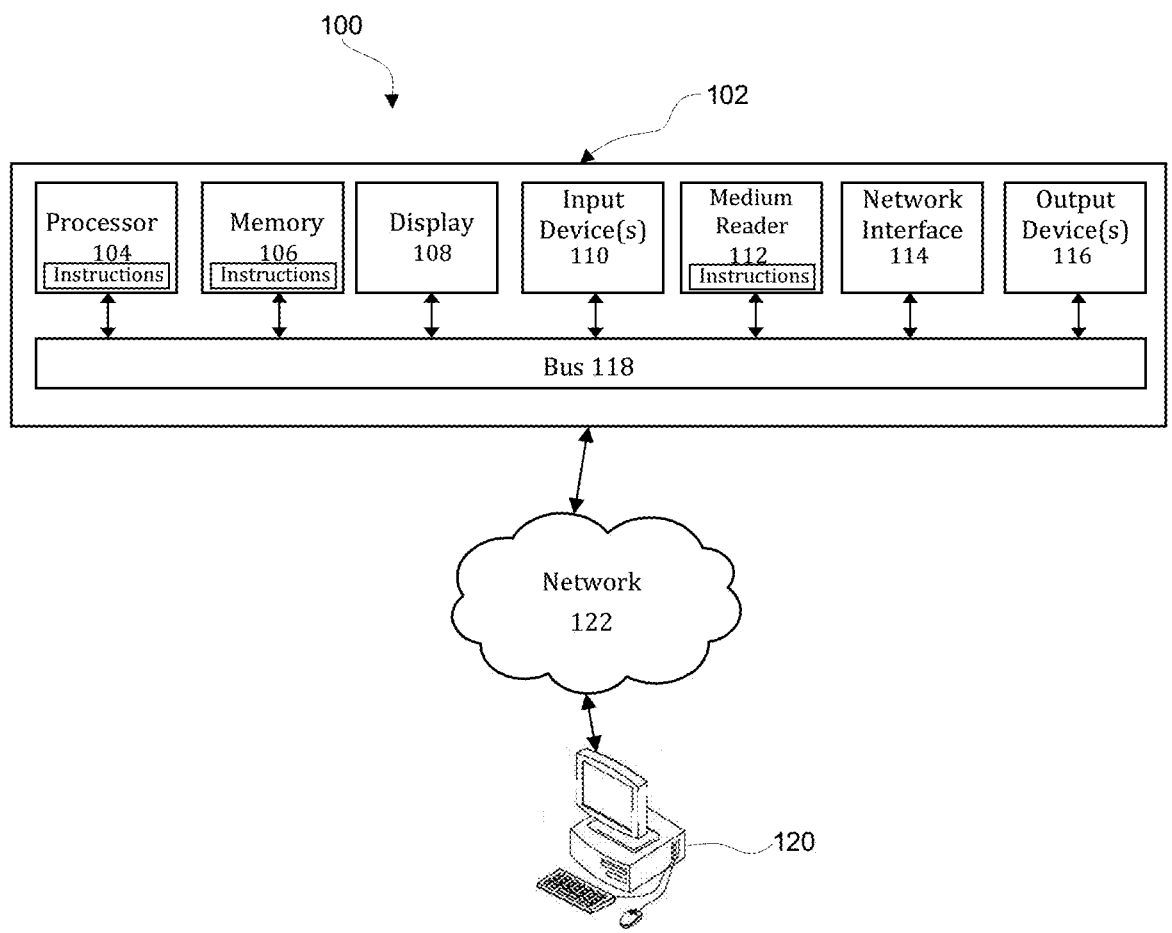
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a large language model to generate executable code for workflow execution in a manner that integrates user feedback and adjusts the workflow as needed while preserving data privacy.

Figure 2:
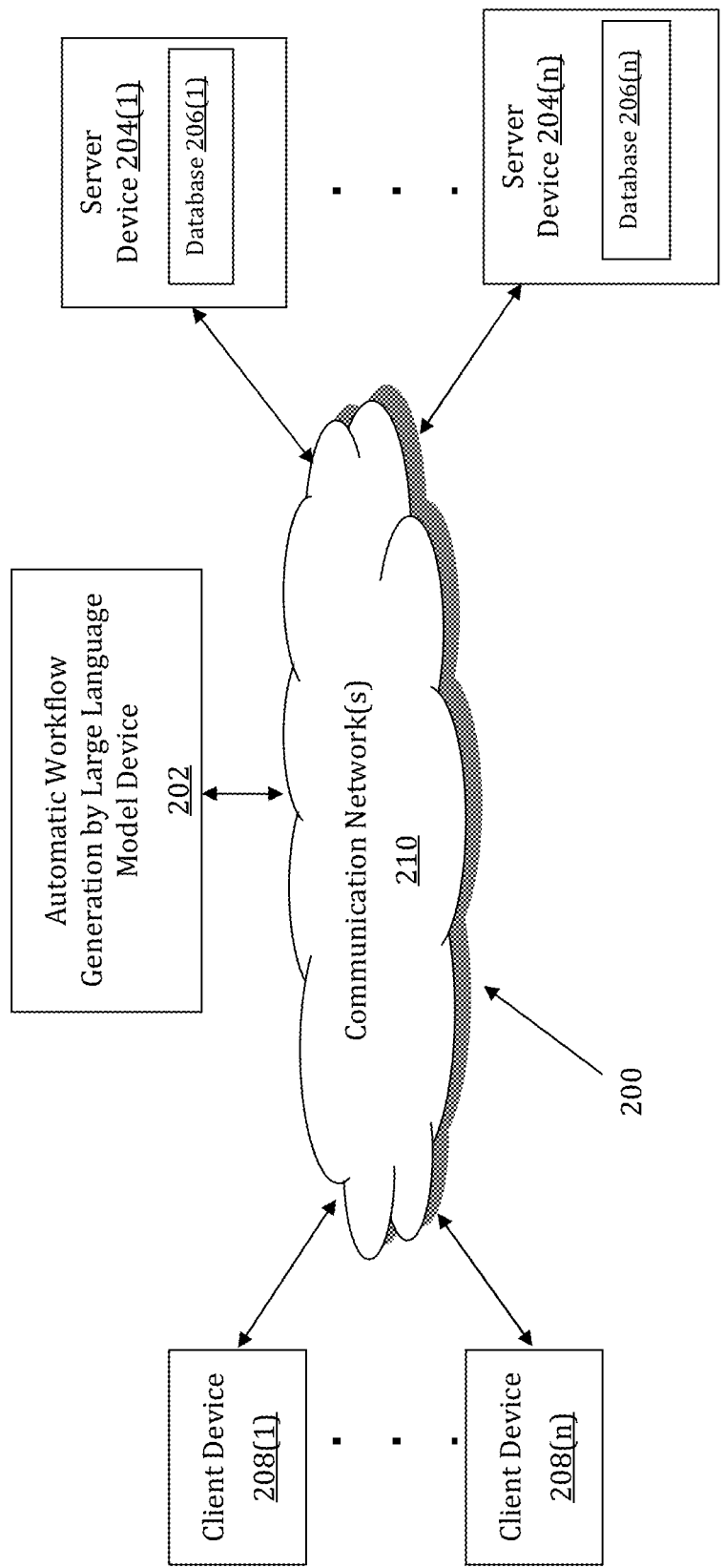
FIG. 2 illustrates an exemplary diagram of a network environment.

Referring to FIG. 2, a schematic of an exemplary network environment 200 for implementing a method for using a large language model to generate executable code for workflow execution in a manner that integrates user feedback and adjusts the workflow as needed while preserving data privacy is illustrated. In an exemplary embodiment, the method is executable on any networked computer platform, such as, for example, a personal computer (PC).

The method for using a large language model to generate executable code for workflow execution in a manner that integrates user feedback and adjusts the workflow as needed while preserving data privacy may be implemented by an Automatic Workflow Generation by Large Language Model (AWGLLM) device 202. The AWGLLM device 202 may be the same or similar to the computer system 102 as described with respect to FIG. 1. The AWGLLM device 202 may store one or more applications that can include executable instructions that, when executed by the AWGLLM device 202, cause the AWGLLM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AWGLLM device 202 itself, may be located in virtual server(s) running in a cloud-based computing environment rather than being tied to one or more specific physical network computing devices. Also, the application(s) may be running in one or more virtual machines (VMs) executing on the AWGLLM device 202. Additionally, in one or more embodiments of this technology, virtual machine(s) running on the AWGLLM device 202 may be managed or supervised by a hypervisor.

In the network environment 200 of FIG. 2, the AWGLLM device 202 is coupled to a plurality of server devices 204(1)-204(n) that hosts a plurality of databases 206(1)-206(n), and also to a plurality of client devices 208(1)-208(n) via communication network(s) 210. A communication interface of the AWGLLM device 202, such as the network interface 114 of the computer system 102 of FIG. 1, operatively couples and communicates between the AWGLLM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AWGLLM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AWGLLM devices that efficiently implement a method for using a large language model to generate executable code for workflow execution in a manner that integrates user feedback and adjusts the workflow as needed while preserving data privacy.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AWGLLM device 202 may be a standalone device or integrated with one or more other devices or apparatuses, such as one or more of the server devices 204(1)-204(n), for example. In one particular example, the AWGLLM device 202 may include or be hosted by one of the server devices 204(1)-204(n), and other arrangements are also possible. Moreover, one or more of the devices of the AWGLLM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AWGLLM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store large language model data and data that relates to tasks, queries, and user feedback with respect to workflows.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AWGLLM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AWGLLM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AWGLLM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AWGLLM device 202, the server devices 204(1)-204(n), or the client devices 208(1)-208(n), for example, may be configured to operate as virtual instances on the same physical machine. In other words, one or more of the AWGLLM device 202, the server devices 204(1)-204(n), or the client devices 208(1)-208(n) may operate on the same physical device rather than as separate devices communicating through communication network(s) 210. Additionally, there may be more or fewer AWGLLM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
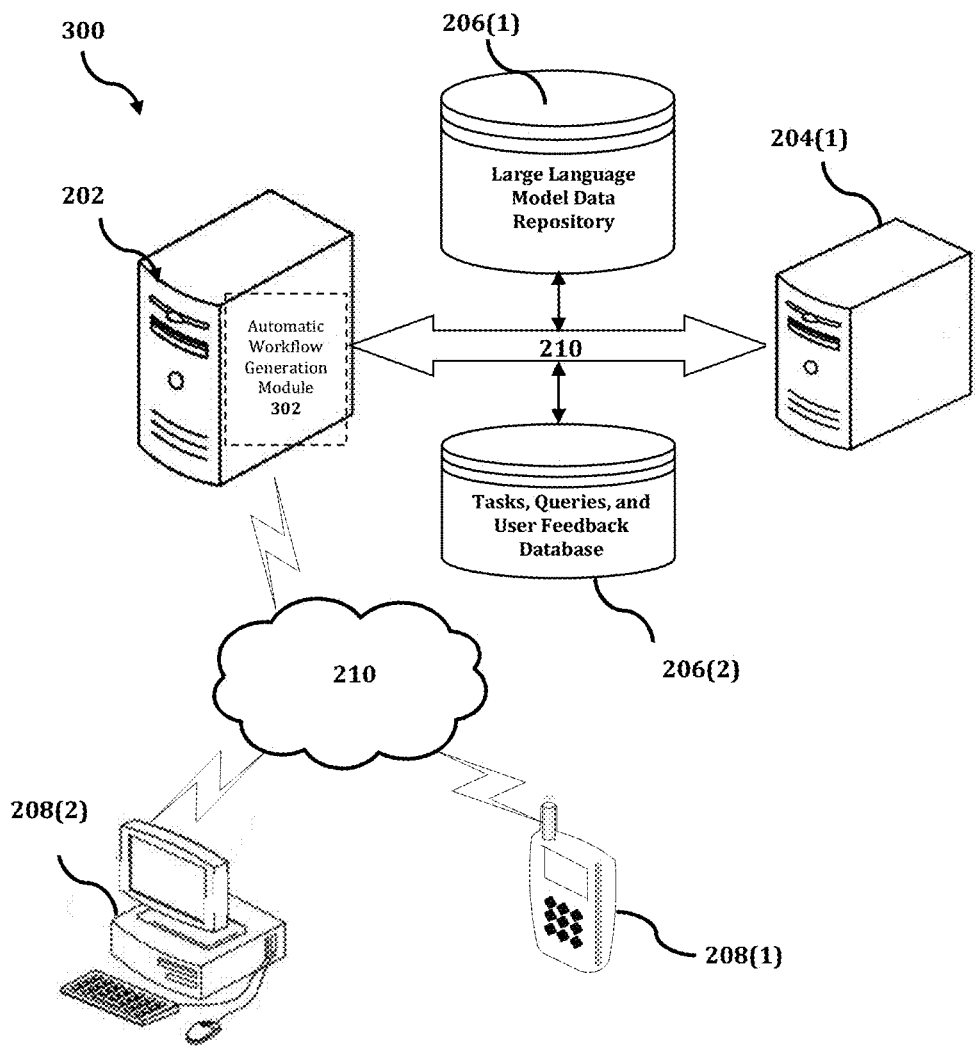
FIG. 3 shows an exemplary system for implementing a method for using a large language model to generate executable code for workflow execution in a manner that integrates user feedback and adjusts the workflow as needed while preserving data privacy.

The AWGLLM device 202 is described and illustrated in FIG. 3 as including an automatic workflow generation module 302, although it may include other rules, policies, modules, databases, or applications, for example. As will be described below, the automatic workflow generation module 302 is configured to implement a method for using a large language model to generate executable code for workflow execution in a manner that integrates user feedback and adjusts the workflow as needed while preserving data privacy.

An exemplary process 300 for implementing a mechanism for using a large language model to generate executable code for workflow execution in a manner that integrates user feedback and adjusts the workflow as needed while preserving data privacy by utilizing the network environment of FIG. 2 is illustrated as being executed in FIG. 3. Specifically, a first client device 208(1) and a second client device 208(2) are illustrated as being in communication with AWGLLM device 202. In this regard, the first client device 208(1) and the second client device 208(2) may be "clients" of the AWGLLM device 202 and are described herein as such. Nevertheless, it is to be known and understood that the first client device 208(1) and/or the second client device 208(2) need not necessarily be "clients" of the AWGLLM device 202, or any entity described in association therewith herein. Any additional or alternative relationship may exist between either or both of the first client device 208(1) and the second client device 208(2) and the AWGLLM device 202, or no relationship may exist.

Further, AWGLLM device 202 is illustrated as being able to access a large language model data repository 206(1) and a tasks, queries, and user feedback database 206(2). The automatic workflow generation module 302 may be configured to access these databases for implementing a method for using a large language model to generate executable code for workflow execution in a manner that integrates user feedback and adjusts the workflow as needed while preserving data privacy.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AWGLLM device 202 via broadband or cellular communication. Of course, these embodiments are merely exemplary and are not limiting or exhaustive.

Upon being started, the automatic workflow generation module 302 executes a process for using a large language model to generate executable code for workflow execution in a manner that integrates user feedback and adjusts the workflow as needed while preserving data privacy. An exemplary process for using a large language model to generate executable code for workflow execution in a manner that integrates user feedback and adjusts the workflow as needed while preserving data privacy is generally indicated at flowchart 400 in FIG. 4.

Figure 4:
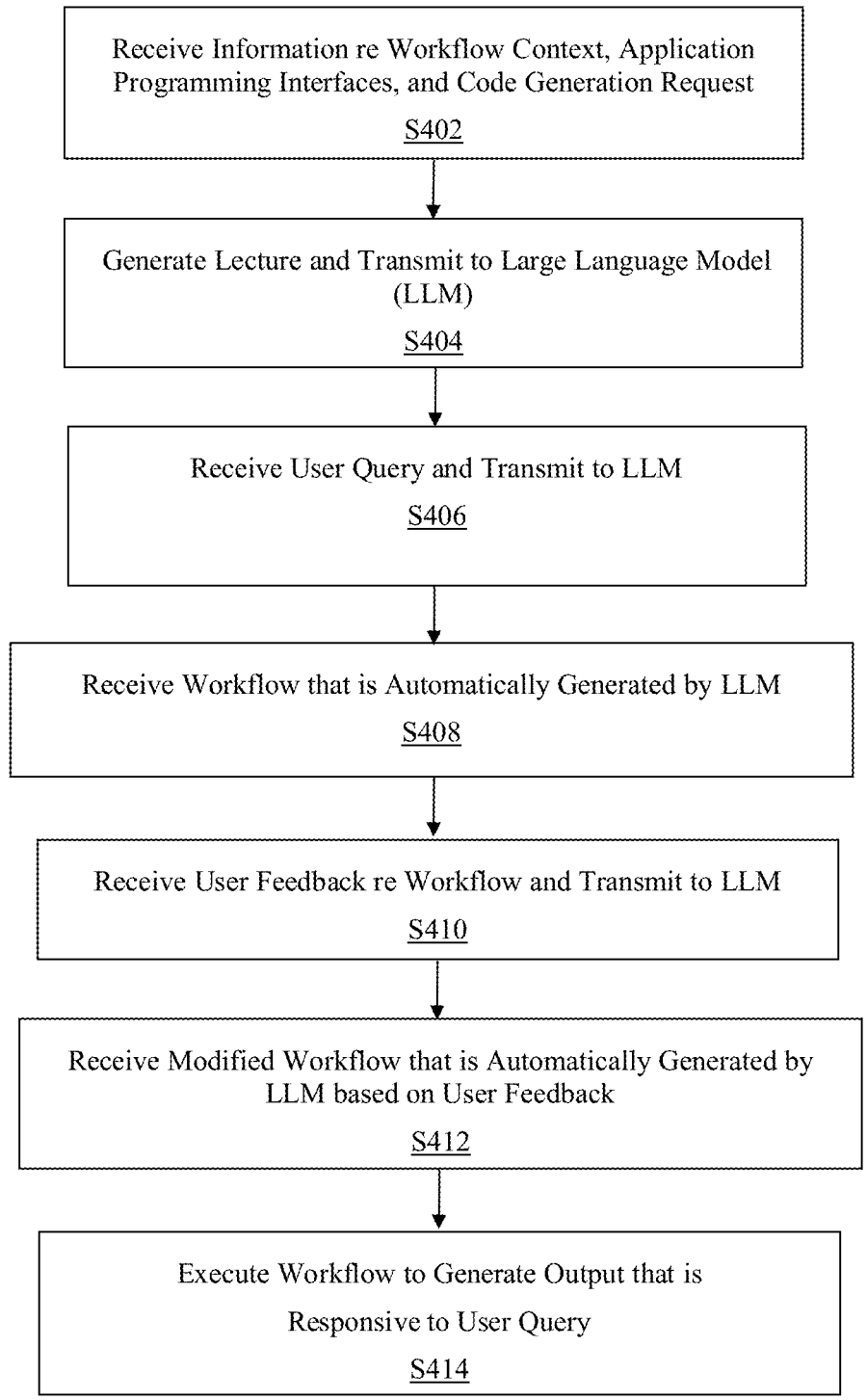
FIG. 4 is a flowchart of an exemplary process for implementing a method for using a large language model to generate executable code for workflow execution in a manner that integrates user feedback and adjusts the workflow as needed while preserving data privacy.

In process 400 of FIG. 4, at step S402, the automatic workflow generation module 302 receives first information that relates to a workflow context, second information that relates to at least one application programming interface (API), and third information that relates to a code generation request. In an exemplary embodiment, the first information may include a textual description of a task to be performed based on an expected type of query that may be received from a user. For example, the first information may include a sentence or a short paragraph that describes such a task.

In an exemplary embodiment, the second information may include a name, an input argument type, and a description of an output type for each of a set of available APIs. The set of APIs may correspond to a predetermined library of functions.

At step S404, the automatic workflow generation module 302 generates a lecture based on the first information, second information, and third information received in step S402. The lecture is designed as an input to a large language model (LLM), and as such, after the lecture is generated, the lecture is transmitted to the LLM.

At step S406, the automatic workflow generation module 302 receives, from a user, a query that relates to performing a task. The user query is then transmitted to the LLM. In an exemplary embodiment, the user query may include a request for a specific type of information. For example, the user query may relate to information that is included in a set of annual filing for registered investment companies that are submitted pursuant to one or more governmental regulations and are publicly available. This information may relate to a single fund that is administered by a single investment company, or, alternatively, to several funds that are administered by that same company.

The LLM then uses the lecture and the user query to automatically generate a workflow that is designed to facilitate obtaining a result that is responsive to the query. Then, at step S408, the automatic workflow generation module 302 receives the workflow generated by the LLM.

At step S410, the automatic workflow generation module 302 receives user feedback that relates to the workflow, and then transmits the user feedback to the LLM. Then, at step S412, the automatic workflow generation module 302 receives a modified workflow that is automatically generated by the LLM based on the user feedback. It is noted that the user feedback is optional, because there is no requirement that the user provide feedback in order to generate the workflow; however, it is likely that such user feedback will lead to an improved quality in the resulting workflow.

At step S414, the automatic workflow generation module 302 executes the workflow in order to generate an output that is responsive to the user query received in step S406. In an exemplary embodiment, the output is displayable on a display via a graphical user interface (GUI), so that the user is able to see the response to the query.

The rapidly evolving field of Robotic Process Automation (RPA) has made significant strides in automating repetitive processes, yet its effectiveness diminishes in scenarios requiring spontaneous or unpredictable tasks demanded by users. The present disclosure describes a novel approach, referred to herein as "FlowMind," which is designed to leverage the capabilities of Large Language Models (LLMs) such as Generative Pretrained Transformer (GPT) in order to address this limitation and create an automatic workflow generation system. In FlowMind, a generic prompt recipe for a lecture that helps ground LLM reasoning with reliable Application Programming Interfaces (APIs) is provided. With this, FlowMind not only mitigates the common issue of hallucinations in LLMs, but also eliminates direct interaction between LLMs and proprietary data or code, thus ensuring the integrity and confidentiality of information. FlowMind further simplifies user interaction by presenting high-level descriptions of auto-generated workflows, enabling users to inspect and provide feedback effectively.

In an exemplary embodiment, a key feature of the framework lies in its robustness against hallucinations often experienced with LLMs. The reasoning of LLMs is grounded with the aid of APIs, which are reliable functions developed and tested by domain experts, thus ensuring their accuracy and reliability. Proprietary software developed in industry is typically composed of such reliable APIs. FlowMind is able to leverage APIs provided to it while ensuring that the LLMs do not directly interact with any proprietary code or data, thereby protecting code and data privacy. This protection is achieved by allowing LLMs to act only on the high-level descriptions of the APIs, thus enhancing security and ensuring a reliable generation of workflows.

In recognition of the necessity for human oversight, in an exemplary embodiment, the FlowMind system also integrates user feedback. Without assuming the programming experiences of the user, the system provides a high-level description of the auto-generated workflow, thereby allowing novice users to inspect and provide feedback. FlowMind then takes the user feedback and adjusts the generated workflow if needed. This two-way interaction empowers users to enhance the workflow based on their knowledge and the unique demands of their tasks, thus enhancing the flexibility and adaptability of the system.

Figure 5:
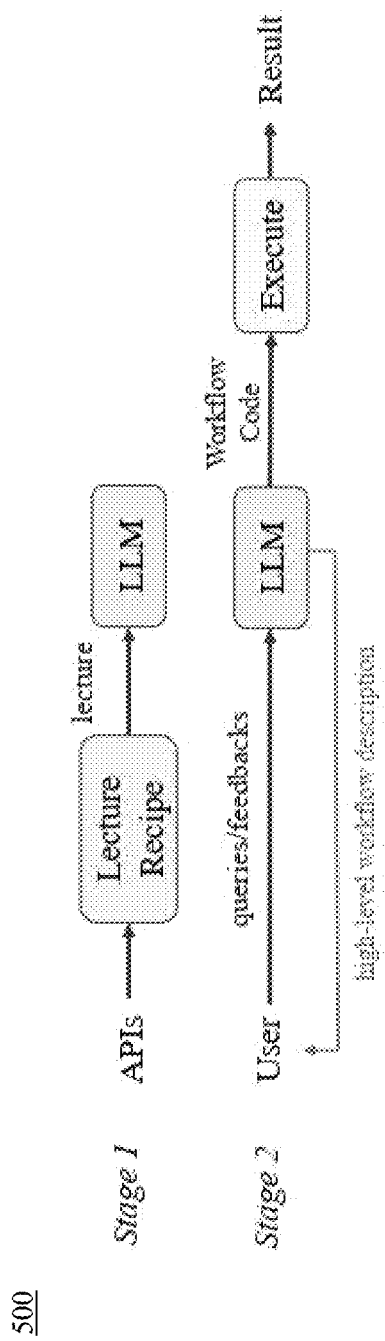
FIG. 5 is a diagram that illustrates a framework for a method for using a large language model to generate executable code for workflow execution in a manner that integrates user feedback and adjusts the workflow as needed while preserving data privacy, according to an exemplary embodiment.

FIG. 5 is a diagram 500 that illustrates a framework for a method for using a large language model to generate executable code for workflow execution in a manner that integrates user feedback and adjusts the workflow as needed while preserving data privacy, according to an exemplary embodiment. As illustrated in FIG. 5, the FlowMind framework functions in two primary stages: 1) Stage 1: A generic lecture recipe is followed in order to generate a lecture prompt, which educates the LLM about the context, APIs, and the need to generate workflow code; and 2) Stage 2: The LLM can then take user queries and/or tasks and auto-generate the workflow code that makes use of the introduced APIs. The workflow code is executed to deliver the result. During stage 2, a feedback loop between FlowMind and the user is enabled. In this feedback loop, FlowMind provides a high-level description of the generated workflow in plain-language, and the user inputs feedback to FlowMind to approve or refine the workflow if needed.

FIG. 6 is an example of a lecture 600 that is generated and fed as an input to a large language model in a method for using a large language model to generate executable code for workflow execution in a manner that integrates user feedback and adjusts the workflow as needed while preserving data privacy, according to an exemplary embodiment.

Lecture to LLM: The first stage of the FlowMind framework entails the generation of a lecture on the context, available APIs, and the need to generate workflow code for the LLM. A generic lecture recipe is used to generate an informative lecture on the context and APIs, thus ensuring that the LLM has a clear understanding of the overall goal, as well as the scope, inputs, and outputs of the functions in the APIs. In an exemplary embodiment, the lecture recipe is crafted with three components, each with a distinct role.

These three components include the following: 1) Context: The context covers the domain of the expected tasks/queries from the user. For example, referring to FIG. 6, the context may relate to handling information queries from a user. 2) APIs: A list of structured descriptions of the available APIs for use by the LLM is provided. In an exemplary embodiment, the list includes the name of each respective function, the input arguments, and the output variables for each API. The function names, input arguments, and output descriptions must be semantically meaningful and relevant to the context such that the LLM can comprehend to make good use of the functions. 3) Code: The lecture concludes by asking the LLM to prepare to write workflow code using the provided APIs upon receiving a query and/or task from a user.

An example lecture 600 is shown in FIG. 6. The crafted prompt following the lecture recipe enables the LLM to gain the necessary understanding of the context and available APIs and to utilize them in the subsequent stage of workflow generation effectively.

Workflow Generation and Execution: Referring again to FIG. 5, in the second stage, the LLM leverages the API knowledge gained from the first stage to take user queries or tasks and generate corresponding workflow code. This stage involves two key components, i.e., code generation and code execution. In code generation, the LLM creates a workflow, making use of the introduced APIs to address the user's query or task effectively. The workflow is then executed to generate the output to the user.

Figure 7:
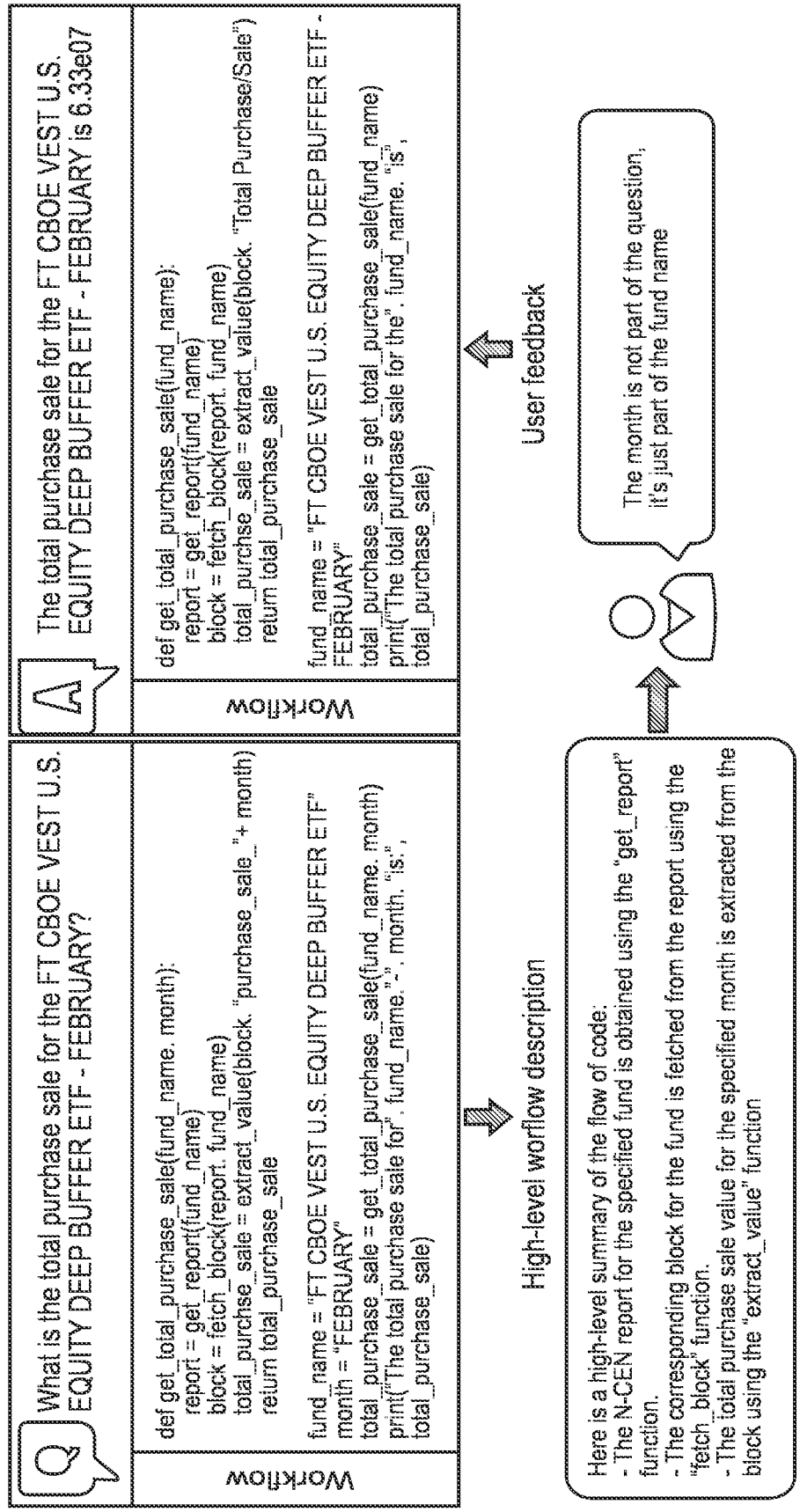
FIG. 7 is an example of correcting a workflow based on user feedback in a method for using a large language model to generate executable code for workflow execution in a manner that integrates user feedback and adjusts the workflow as needed while preserving data privacy, according to an exemplary embodiment.

FIG. 7 is an example 700 of correcting a workflow based on user feedback in a method for using a large language model to generate executable code for workflow execution in a manner that integrates user feedback and adjusts the workflow as needed while preserving data privacy, according to an exemplary embodiment.

Referring to FIG. 7, a distinct feature of FlowMind is the ability to take user feedback during the second stage. The system presents a high-level description of the generated workflow to the user, thereby enabling users to understand the workflow's functionality and structure without the need to closely examine the underlying code. This allows the users to effectively provide feedback on the generated workflow, which the LLM can then incorporate to refine the workflow if necessary, ensuring that the system accurately addresses the user's needs. In an exemplary embodiment, the LLM may be prompted by submitting the following inquiry: "Could you provide a concise high-level summary of the flow of code? Then take feedback to see if code needs to be updated". This prompt then facilitates an acquisition of a high-level workflow description.

Accordingly, with this technology, a process for using a large language model to generate executable code for workflow execution in a manner that integrates user feedback and adjusts the workflow as needed while preserving data privacy is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for generating a workflow, the method being implemented by at least one processor, the method comprising:
   receiving, by the at least one processor, first information that relates to a workflow context, second information that relates to at least one application programming interface (API), and third information that relates to a code generation request;
   transmitting a lecture, generated by the at least one processor based on the first information, the second information, and the third information, to a language model;
   receiving, by the at least one processor from a user, a query that relates to performing a task, and transmitting the query to the language model;
   receiving, by the at least one processor from the language model, a workflow that is automatically generated by the language model based on the lecture and the query; and
   generating, by the at least one processor from the language model, executable code for workflow execution.

2. The method of claim 1, further comprising executing the workflow in order to generate an output that is responsive to the query.

3. The method of claim 1, further comprising:
   receiving, from the user, feedback that relates to the workflow;
   transmitting the feedback to the language model; and
   receiving, from the language model, a modified workflow that is automatically generated based on the feedback.

4. The method of claim 1, wherein the first information includes a textual description of a domain of a task to be performed based on an expected type of the query.

5. The method of claim 1, wherein the second information includes a name, an input argument type, and a description of an output type for at least one API from among a predetermined set of APIs that corresponds to a predetermined library of functions.

6. The method of claim 1, wherein the query includes a request for a specific type of information.

7. The method of claim 6, wherein the query relates to fourth information included in a set of annual filings for registered investment companies that are submitted pursuant to a governmental regulation and are publicly available.

8. The method of claim 7, wherein the fourth information relates to a single fund that is administered by a single investment company.

9. The method of claim 7, wherein the fourth information relates to a plurality of funds that are administered by a single investment company.

10. The method of claim 1, further comprising displaying an output on a display via a graphical user interface (GUI).

11. A computing apparatus for generating a workflow, the computing apparatus comprising:
    a processor;

a memory;
a display; and
a communication interface coupled to each of the processor, the memory, and the display,
wherein the processor is configured to:
receive, via the communication interface, first information that relates to a workflow context, second information that relates to at least one application programming interface (API), and third information that relates to a code generation request;
transmit a lecture, generated by the at least one processor based on the first information, the second information, and the third information, to a language model;
receive, via the communication interface from a user, a query that relates to performing a task, and transmit the query to the language model;
receive, from the language model, a workflow that is automatically generated by the language model based on the lecture and the query; and
generate, from the language model, executable code for workflow execution.

12. The computing apparatus of claim 11, wherein the processor is further configured to execute the workflow in order to generate an output that is responsive to the query.

13. The computing apparatus of claim 11, wherein the processor is further configured to:
receive, from the user via the communication interface, feedback that relates to the workflow;
transmit the feedback to the language model; and
receive, from the language model, a modified workflow that is automatically generated based on the feedback.

14. The computing apparatus of claim 11, wherein the first information includes a textual description of a domain of a task to be performed based on an expected type of the query.

15. The computing apparatus of claim 11, wherein the second information includes a name, an input argument type, and a description of an output type for at least one API from among a predetermined set of APIs that corresponds to a predetermined library of functions.

16. The computing apparatus of claim 11, wherein the query includes a request for a specific type of information.

17. The computing apparatus of claim 16, wherein the query relates to fourth information included in a set of annual filings for registered investment companies that are submitted pursuant to a governmental regulation and are publicly available.

18. The computing apparatus of claim 11, wherein the processor is further configured to cause the display to display an output via a graphical user interface (GUI).

19. A non-transitory computer readable storage medium storing instructions for generating a workflow, the storage medium comprising first executable code which, when executed by a processor, causes the processor to:
receive first information that relates to a workflow context, second information that relates to at least one application programming interface (API), and third information that relates to a code generation request;
transmit a lecture, generated by the at least one processor based on the first information, the second information, and the third information, to a language model;
receive, from a user, a query that relates to performing a task, and transmit the query to the language model;
receive, from the language model, a workflow that is automatically generated by the language model based on the lecture and the query; and
generate, from the language model, second executable code for workflow execution.

20. The storage medium of claim 19, wherein when executed, the first executable code further causes the processor to execute the workflow in order to generate an output that is responsive to the query.

* * * * *